(12) United States Patent
Sloane et al.

(10) Patent No.: US 11,784,819 B2
(45) Date of Patent: *Oct. 10, 2023

(54) DYNAMIC SEGMENTATION OF NETWORK TRAFFIC BY USE OF PRE-SHARED KEYS

(71) Applicant: BANK OF AMERICA CORPORATION, Charlotte, NC (US)

(72) Inventors: Brandon Sloane, Santa Barbara, CA (US); Regina Yee Cadavid, San Gabriel, CA (US); Gloria Joo, Moorpark, CA (US); Jinyoung Nathan Kim, Charlotte, NC (US); Nia Mack, Addison, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/725,445

(22) Filed: Apr. 20, 2022

(65) Prior Publication Data

US 2022/0255747 A1 Aug. 11, 2022

Related U.S. Application Data

(63) Continuation of application No. 16/889,945, filed on Jun. 2, 2020, now Pat. No. 11,343,097.

(51) Int. Cl.
*H04L 29/06* (2006.01)
*H04L 9/32* (2006.01)
(Continued)

(52) U.S. Cl.
CPC .......... *H04L 9/3226* (2013.01); *H04L 9/0643* (2013.01); *H04L 9/3247* (2013.01);
(Continued)

(58) Field of Classification Search
CPC ... H04L 9/3226; H04L 9/0643; H04L 9/3247; H04L 47/13; H04L 63/0876;
(Continued)

(56) References Cited

U.S. PATENT DOCUMENTS 6,275,587 B1 8/2001 Amerige
6,996,714 B1 * 2/2006 Halasz ................. H04L 9/3273
713/168

(Continued)

OTHER PUBLICATIONS

Rivest, Ronald L. "Chaffing and winnowing: Confidentiality without encryption." CryptoBytes (RSA laboratories) 4.1 (1998): 12-17. (Year: 1998).*

(Continued)

*Primary Examiner* — Ka Shan Choy
(74) *Attorney, Agent, or Firm* — Moore & Van Allen PLLC; James C. Edwards (57) ABSTRACT

Dynamic segmentation of network traffic through the use of Pre-Shared Keys (PSKs). Each defined network segment uses a different pre-shared key and a message authentication code (MAC)-signing algorithm to sign data packets with segment-specific MACs. As such, only those computer hosts/nodes that are in the network segment (i.e., have been assigned the same pre-shared key for generating and decoding the MAC signed data packets) are capable or reading the segment's network traffic. By implementing segment-specific MAC signed data packets, the present invention allows for confidential data transmission absent the need to encrypt the actual contents/data being transmitted.

19 Claims, 6 Drawing Sheets

(51) Int. Cl.
*H04L 9/40* (2022.01)
*H04L 9/06* (2006.01)
*H04L 47/10* (2022.01)

(52) U.S. Cl.
CPC .......... *H04L 47/13* (2013.01); *H04L 63/0876* (2013.01); *H04L 63/1425* (2013.01)

(58) Field of Classification Search
CPC . H04L 63/1425; H04L 9/3242; H04L 63/062; H04L 63/065; H04L 63/126
See application file for complete search history.

(56) References Cited

U.S. PATENT DOCUMENTS

| | | |
|---|---|---|
| 7,328,457 B1 | 2/2008 | Mister |
| 7,512,986 B2 | 3/2009 | Shen-Orr et al. |
| 7,813,506 B2 | 10/2010 | Moskowitz et al. |
| 7,920,702 B2 | 4/2011 | Shen-Orr et al. |
| 8,046,841 B2 | 10/2011 | Moskowitz et al. |
| 8,160,249 B2 | 4/2012 | Moskowitz et al. |
| 8,272,051 B1 | 9/2012 | Zhao et al. |
| 8,351,605 B2 | 1/2013 | Bandholz et al. |
| 8,391,485 B2 | 3/2013 | Bandholz, Sr. et al. |
| 8,578,480 B2 | 11/2013 | Judge et al. |
| 10,305,689 B2 | 5/2019 | Araki |
| 2002/0154631 A1 | 10/2002 | Makansi et al. |
| 2007/0245417 A1 | 10/2007 | Lee et al. |
| 2015/0003607 A1 | 1/2015 | Choi et al. |
| 2015/0134963 A1 | 5/2015 | Izu et al. |
| 2017/0139795 A1 | 5/2017 | Komano et al. |
| 2017/0257762 A1 | 9/2017 | Ginzboorg et al. |
| 2017/0353440 A1* | 12/2017 | Murakami ............ H04L 9/3242 |
| 2018/0131524 A1 | 5/2018 | Shin et al. |
| 2019/0356477 A1* | 11/2019 | Usui .................... H04L 9/0891 |
| 2020/0412543 A1* | 12/2020 | Graefe ................ H04L 9/3242 |
| 2021/0271746 A1* | 9/2021 | Chen .................... H04L 9/0891 |
| 2021/0400475 A1 | 12/2021 | Lehtovirta et al. |

OTHER PUBLICATIONS

Ronald L. Rivest. "Chaffing and Winnowing: Confidentiality without Encryption." MIT Lab for Computer Science. Mar. 18, 1998 (rev. Jul. 1, 1998).
https://en.wikipedia.org/wiki/Chaffing_and_winnowing.

* cited by examiner

DYNAMIC SEGMENTATION OF NETWORK TRAFFIC BY USE OF PRE-SHARED KEYS

CROSS-REFERENCE TO RELATED APPLICATION

The present application is a continuation of co-pending U.S. patent application Ser. No. 16/889,945, of the same title and filed on Jun. 2, 2020, which is assigned to the assignee hereof and the contents thereof are hereby expressly incorporated by reference

FIELD OF THE INVENTION

The present invention relates to a computer network security, and more particularly to dynamic segmentation of network traffic by use of pre-shared keys.

BACKGROUND

Typically, conventional encryption techniques are used to secure data transmissions or otherwise ensure that data remains confidential throughout the data transmission/communication process. However, such encryption process often introduces expensive network appliances and/or unnecessary computational overhead.
Therefore, a need exists to develop systems, computer-implemented methods, computer program products and the like that that add confidentiality to data transmissions, while allowing for the data/contents in such transmission to remain "in the clear" (i.e., unencrypted).

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, computer-implemented methods, computer program products and the like that provide for dynamic segmentation of network traffic through the use of Pre-Shared Keys (PSKs). Each defined network segment uses a different pre-shared key and a message authentication code (MAC)-signing algorithm to sign data packets with segment-specific MACs. As such, only those computer hosts/nodes that are in the network segment (i.e., have been assigned the same pre-shared key for generating and decoding the MAC signed data packets) are capable of reading the segment's network traffic. By implementing segment-specific MAC signed data packets, the present invention allows for confidential data transmission absent the need to encrypt the actual contents/data being transmitted.

While in a basic approach segmentation may be configured on a host/node-level, in other embodiments of the invention, the network segmentation be configured on more granular levels, such as, but not limited to, application-layer, data-layer or at the network session layer. In this regard, network segmentation is logical rather than physical and, as such, hosts or other segmented resources may be dynamically moved in to or out of the virtual network segments on demand. In specific embodiments of the invention, a centralized key exchange protocol is implemented that allows for the PSKs to be distributed to segment entities and/or deactivate/removed from segment entities on demand to meet the needs of the overall distributed computing network. While in other embodiments of the invention, computing hosts are configured with agents that provide key-generating algorithms that allow for the same shared key to be generated across multiple hosts. In such embodiments of the invention, the computing hosts themselves can form network segments on an ad-hoc basis (i.e., temporary network segments for specific purposes).

Additional security may be applied to the data transmissions/communications by implementing false data packets, otherwise referred to as "chaff" data packets to further obfuscate the data transmission. During data transmission, the false data packets are interspersed amongst the stream of actual data packets comprising the communication/message. The false data packets are unsigned or signed with a MAC that is different than the MAC of the actual/real data packets. Thus, once the data stream is received by a host/node within the network segment, only the actual data packets signed with segment-specific MAC are read and the false data packets are discarded/dropped. Further, in other embodiments of the invention, a random order in which the actual real data packets are arranged within the data stream may be algorithmically determined to add further confidentiality to the data transmission.

A system for dynamic segmentation of computing network traffic defines first embodiments of the invention. The system includes a plurality of computing hosts, each computing host including a first memory component and at least one first processing component in communication with the first memory component. The first memory component stores first computer-readable instructions that are executable by the at least first one processing component. The instructions are configured to transmit a first communication/message to one or more of the computing hosts comprising a virtual network segment by using a previously received or generated pre-shared key (PSK) to algorithmically generate a Message Authentication Code (MAC) and sign each data packet that comprises the first communication with the MAC. The instructions are further configured to receive a second communication from one of the computing hosts comprising the virtual network segment and read the second communication by (i) using the PSK to algorithmically generate the MAC, (ii) comparing the generated MAC to MAC signatures of data packets within a received stream of data packets, (iii) determining that the generated MAC matches MAC signatures in one or more data packets within the received stream of data packets, and (iv) assembling the one or more data packets into the second communication. Other data packets in the stream of data packets having MAC signatures that do not match the generated MAC are discarded/dropped.

In specific embodiments the system further includes a centralized security system including a second memory component and at least one second processing component in communication with the second memory component. The second memory component stores second computer-readable instructions that are executable by the at least one second processing component. The second instructions are configured to manage key exchange protocol for dynamic distribution of pre-shared keys (PSKs) to the plurality of computing hosts. The distribution of a specific PSK to two or more of the plurality of computing hosts defines a network segment. In other embodiments of the invention, security is decentralized, in that, key generation occurs at the computing host level. In such embodiments of the system, the first instructions are further configured to algorithmically generate the PSK, such that, generation of the PSK by two or more of the computing hosts provides for an ad-hoc network segment (i.e., created on demand for a specific purpose or the like).

In other specific embodiment of the system, the first instructions configured to send the first communication are further configured to insert false data packets within a stream of data packets that includes the data packets comprising the first communication. In such embodiments of the system, the false data packets include portions of concurrently transmitted other communications or previous communications and/or the first instructions are further configured to generate the false data packets. In relate embodiments of the system, the first instructions configured to generate the false data packets are further configured to generate the false data packets by applying at least one of the data packets to an exclusive or (XOR) gate bitwise with a log of network traffic and a pre-computed salt value.

In other specific embodiments of the invention, the first instructions configured to transmit/send the first communication are further configured to algorithmically rearrange the data packets that comprise the first communication in a random order and send the data packets in the random order within a data stream.

In still further specific embodiments of the system, the received or generated PSK defines an application-layer network segment. In such embodiments of the system, the application-layer network segment limits communications being sent and read by specific applications executing on the computing hosts comprising the virtual network segment.

In other specific embodiments of the system, the received or generated PSK defines a data-layer network segment. In such embodiments of the system, the data-layer network segment limits communications being sent and read by specific data types within one or more applications executing on the computing hosts comprising the virtual network segment.

In additional specific embodiments of the system, the received or generated PSK defines a network session-based network segment. In such embodiments of the system, the network-session-based network segment limits communications being sent and read to a duration of a specific network session.

Moreover, in additional specific embodiments of the system, the first instructions are further configured to transmit/send a second communication to one or more computing hosts in another network segment by using a another previously received or generated pre-shared key (PSK) to algorithmically generate another Message Authentication Code (MAC) and sign each data packet that comprises the second communication with the other MAC. In such embodiments of the system, computing hosts are configured to simultaneously belong to more than one virtual network segment.

A computer-implemented method for dynamic segmentation of network traffic defines second embodiments of the invention. The computer-implemented method is executed by one or more computing device processors, The method includes transmitting a first communication to one or more of the computing hosts comprising a virtual network segment by using a previously received or generated pre-shared key (PSK) to algorithmically generate a Message Authentication Code (MAC) and signing each data packet that comprises the first communication with the MAC. In addition, the method includes receiving a second communication from one of the computing hosts and reading the second communication by (ii) using the PSK to algorithmically generate the MAC, (ii) compare the generated MAC to MAC signatures of data packets within a received stream of data packets, (iii) determine that the generated MAC matches MAC signatures in one or more data packets within the received stream of data packets, and (iv) assemble the one or more data packets into the second communication. Other data packets in the stream of data packets having MAC signatures that do not match the generated MAC are discarded.

In specific embodiments the computer-implemented method further includes managing key exchange protocol for dynamic distribution of pre-shared keys (PSKs) to the plurality of computing hosts, wherein the distribution of a specific PSK to two or more of the plurality of computing hosts defines a network segment. While in other specific embodiments the computer-implemented method includes algorithmically generating the PSK at two or more of the computing hosts, wherein generation of the PSK by the two or more of the computing hosts provides for an ad-hoc network segment In other specific embodiments the computer-implemented method further includes inserting false data packets within a stream of data that includes the data packets comprising the first communication, The false data packets include at least one of portions of previous communications and data generated at the computing host.

In still further specific embodiments of the computer-implemented method, the received or generated PSK defines one of (i) an application-layer network segment, (ii) a data-layer network segment and (iii) a network-session network segment.

A computer program product including non-transitory computer-readable medium defines third embodiments of the invention. The computer-readable medium includes a first set of codes configured to cause a computer processing component to transmit a first communication to one or more of the computing hosts comprising a virtual network segment by using a previously received or generated pre-shared key (PSK) to algorithmically generate a Message Authentication Code (MAC) and signing each data packet that comprises the first communication with the MAC. The computer-readable medium additionally includes a second set of codes for causing a computer processing component to receive a second communication from one of the computing hosts and read the second communication by (i) using the PSK to algorithmically generate the MAC, (ii) comparing the generated MAC to MAC signatures of data packets within a received stream of data packets, (iii) determining that the generated MAC matches MAC signatures in one or more data packets within the received stream of data packets, and (iv) assembling the one or more data packets into the second communication. Other data packets in the stream of data packets having MAC signatures that do not match the generated MAC are discarded/dropped.

In specific embodiments of the computer program product, the computer-readable medium further includes a third set of codes for causing a computer processing component to manage key exchange protocol for dynamic distribution of pre-shared keys (PSKs) from a centralized computing entity to the plurality of computing hosts, wherein the distribution of a specific PSK to two or more of the plurality of computing hosts defines a network segment.

In other specific embodiments of the computer program product, the computer-readable medium further includes a third set of codes for causing a computer processing component to insert false data packets within a stream of data that includes the data packets comprising the first communication. The false data packets include at least one of portions of previous communications and data generated at the computing host.

Thus, systems, apparatus, methods, and computer program products herein described in detail below provide for dynamic network segmentation through the use of segment-specific PSKs and MAC-signing algorithms. Each defined network segment uses a different pre-shared key and a message authentication code (MAC)-signing algorithm to sign data packets with segment-specific MACs. As such, only those computer hosts/nodes that are in the network segment (i.e., have been assigned the same pre-shared key for generating and decoding the MAC signed data packets) are capable or reading the segment's network traffic.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, embodiments of the invention provide for dynamic segmentation of network traffic through the use of Pre-Shared Keys (PSKs). Each defined network segment uses a different pre-shared key and a message authentication code (MAC)-signing algorithm to sign data packets with segment-specific MACs. As such, only those computer hosts/nodes that are in the network segment (i.e., have been assigned the same pre-shared key for generating and decoding the MAC signed data packets) are capable or reading the segment's network traffic. By implementing segment-specific MAC signed data packets, the present invention allows for confidential data transmission absent the need to encrypt the actual contents/data being transmitted.

Figure 1:
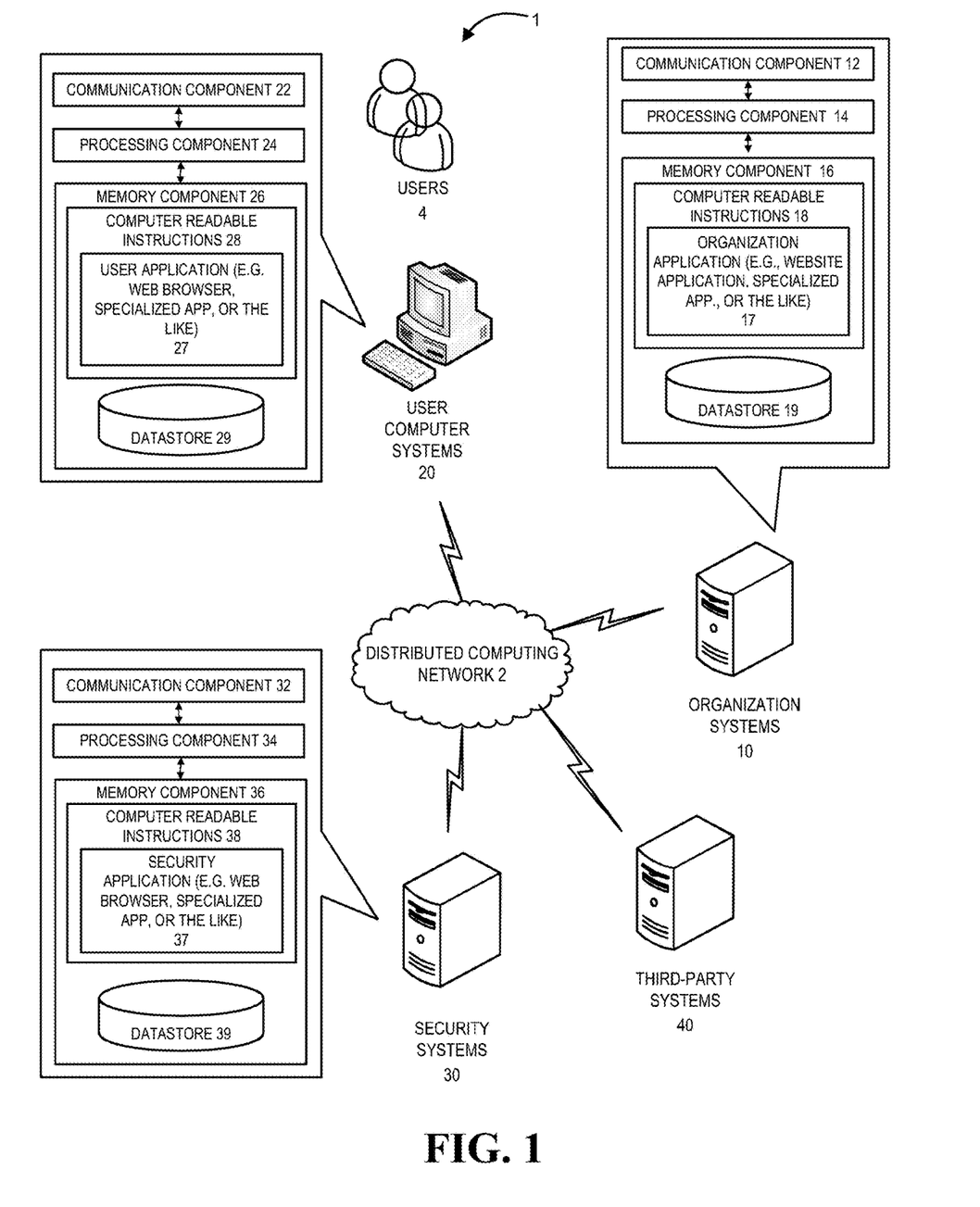
FIG. 1 is a schematic diagram of a network security system environment, in accordance with embodiments of the present disclosure.

FIG. 1 illustrates a network security system environment 1, in accordance with embodiments of the present disclosure. As illustrated in FIG. 1, one or more organization systems 10 are operatively coupled, via a distributed computing distributed computing network 2, to one or more user computer systems 20, one or more security systems 30, one or more third-party systems 40, and/or one or more other systems (not illustrated). In this way, the security systems 30 (in coordination with the user computer systems 20 and/or other systems on the network) may be utilized to create secure communications over the distributed computing network 2 without the need to encrypt all or a majority of the communications between the systems on the distributed computing distributed computing network 2. As will be described herein, the security systems 30 and/or other systems described herein may utilize security signatures (e.g., keys, Message Authentication Codes (MACs), and/or the like) attached to data packets to allow a receiving system to identify the valid data packets for a communication (e.g., message, file or the like). For example, the security systems 30 and/or other systems (e.g., user computer systems 20) may create and/or assign one or more keys (e.g., pre-shared keys, such a global network keys, content keys, segmentation keys, or the like) and one or more algorithms (e.g., pre-shared algorithm, or the like). The one or more keys and the one or more algorithms may be utilized to create MACs for each of the data packets being sent, in particular, real/valid data packets, otherwise referred to herein as "wheat" data packets, as will be discussed herein. Moreover, false data packets (e.g. unrelated real data packets, imitation data packets, combinations thereof, or the like) otherwise referred to herein as "chaff" data packets may be interspersed with real data packets when sending a communication. Any receiving system must be able to identify the security signature in order to determine what data packets are real data packets (i.e., actual portions of the communication) and what data packets are false data packets that should be discarded. For example, each receiving system may have the key (e.g., pre-shared key) and the one or more algorithms in order to determine what MAC attached to a packet is valid, and thus, identify what data packets are real data packets and what are false data packets that can be discarded. The real data packets can then be identified as part of the communication. In addition, the communication may be segmented into a plurality of real data packets before the security signature is added, which may be communicated in order/sequentially or randomly. As such, the receiving system may also have to determine the correct order of the real data packets and reassemble the plurality of real data packets together in order to properly compile the communication. While security is achieved through keys, MACs, data packet segmentation or the like, the body portion of the communication (i.e., the message itself) is sent over the distributed computing network 2 without any encryption, i.e., "in the clear", as will be described in further detail herein. The communications that may utilize the embodiments of the present disclosure, may include any type of communication such as, but not limited to, communication related to a computer system trying to access a network, communications between segmented computer systems within a network trying to communicate with other computer systems within the same segment, computer systems trying to communication with systems on other networks, or the like. The communications may relate to interactions, accessing data, running applications, sending messages, or the like, as will be discussed in further detail herein.

The distributed computing network 2 may be a global area network (GAN), such as the Internet, a wide area network (WAN), a local area network (LAN), or any other type of network or combination of networks. The distributed computing network 2 may provide for wireline, wireless, or a combination of wireline and wireless communication between systems, services, components, and/or devices on the distributed computing network 2.

As illustrated in FIG. 1, the one or more organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components may include functionality to operate one or more software programs based on computer-readable instructions thereof, which may be stored in the one or more memory components.

The one or more processing components 14 use the one or more communication components 12 to communicate with the distributed computing network 2 and other components on the distributed computing network 2, such as, but not limited to, the components of the one or more user computer systems 20, the one or more security systems 30, the one or more third-party systems 40, and/or the one or more other systems (not illustrated). As such, the one or more communication components 12 generally comprise a wireless transceiver, modem, server, electrical connection, electrical circuit, or other component for communicating with other components on the distributed computing network 2. The one or more communication components 12 may further include an interface that accepts one or more network interface cards, ports for connection of network components, Universal Serial Bus (USB) connectors, or the like.

As further illustrated in FIG. 1, the one or more organization systems 10 comprise computer-readable instructions 18 stored in the one or more memory components 16, which in some embodiments includes the computer-readable instructions 18 of the one or more organization applications 17 (e.g., secure website application, secure dedicated application, or the like). In some embodiments, the one or more memory components 16 include one or more data stores 19 for storing data related to the one or more organization systems 10, including, but not limited to, data created, accessed, and/or used by the one or more organization applications 17. The organization may be an entity that administers, controls, or regulates the distributed computing network 2, user computer systems 20, the security systems 30, and/or the third-party systems 40. It should be understood that the users 4, third-parties, and organizations may all be referred to herein as entities.

As illustrated in FIG. 1, users 4 may communicate with each other over the distributed computing network 2 as will be described in further detail herein. In some embodiments the security system 30 may be used to secure the communications over the distributed computing network 2 and/or, in some embodiments, each of the systems on the distributed computing network 2 may include a portion of the security systems 30 and/or application 37 thereof, such as an agent that may communicate with each of the computer systems or be located, at least partially, on each of the computer systems 20. It should be understood that users 4 may include a user that is in communication with other users on the network 4 through the use of the user computer systems 20. The users 4 may be representing themselves in a communication, a user representing a third-party in an interaction, a user that acts on behalf of the organization, a user that acts on behalf of the security system 30 and the like. Consequently, the one or more users 4 may be individual users and/or employees, agents, representatives, officers, or the like of any entity on the distributed computing network 2. In particular embodiments, the distributed computing network 2 may be a network of a business and the users are the employees, agents, officers, or the like of the business.

As such, the user computer systems 20 may communicate with each other, the one or more organization systems 10, the one or more security systems 30, the one or more third-party systems 40, and/or other systems (not illustrated). The one or more user computer systems 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the distributed computing network 2 and other components on the distributed computing network 2, such as, but not limited to, the one or more organization systems 10, the one or more security systems 30, the one or more third-party systems 40, and/or the other systems (not illustrated). As such, the one or more communication components 22 generally comprise a wireless transceiver, modem, server, electrical connection, or other component for communicating with other components on the distributed computing network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the one or more user computer systems 20 may have computer-readable instructions 28 stored in the one or more memory components 26, which in some embodiments includes the computer-readable instructions 28 for user applications 27, such as dedicated applications (e.g., apps, applet, or the like), portions of dedicated applications, a web browser or other apps that allow access to applications located on other systems, or the like. In some embodiments, the one or more memory components 26 include one or more data stores 29 for storing data related to the one or more user computer systems 20, including, but not limited to, data created, accessed, and/or used by the one or more user computer systems 20. The user application 27 may use the applications of the one or more organization systems 10, the one or more security systems 30, the one or more third-party systems 40, and/or one or more other systems (not illustrated) in order to communicate with other systems on the network and take various actions in a secure way without having to encrypt all or the majority of the communications over the distributed computing network 2.

As illustrated in FIG. 1, one or more security systems 30 may be utilized by the one or more organization systems 10, the one or more user computer systems 20, the one or more third party systems 40, and/or other systems to aid in providing secure communications without requiring encryption of all or most of the communications. That is, the security system 30 may be utilized in order to create, store, manage or the like the keys (e.g., pre-shared keys, such as global keys, segmentation keys, specific communication keys, or the like) and/or the algorithms (e.g., MAC algorithms used to create the MACs), and/or communicate with the systems (e.g., the agents thereon, or the like) on the distributed computing network 2 to facilitate the secure communications.

As such, the one or more security systems 30 are operatively coupled, via a distributed computing network 2, to the one or more organization systems 10, the one or more user computer systems 20, the one or more third-party systems 40, and/or the other systems (not illustrated). The one or more security systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the distributed computing network 2 and other components on the distributed computing network 2, such as, but not limited to, the components of the one or more organization systems 10, the one or more user computer systems 20, the one or more third-party systems 40, and/or the one or more other systems (not illustrated). As such, the one or more communication components 32 generally comprise a wireless transceiver, modem, server, electrical connection, or other component for communicating with other components on the distributed computing network 2. The one or more communication components 32 may further include an interface that accepts one or more network interface cards, ports for connection of network components, Universal Serial Bus (USB) connectors and the like.

As illustrated in FIG. 1, the one or more security systems 30 may have computer-readable instructions 38 stored in the one or more memory components 36, which in one embodiment includes the computer-readable instructions 38 of one or more security applications 37. In some embodiments, the one or more memory components 36 include one or more data stores 39 for storing data related to the one or more security systems 30, including, but not limited to, data created, accessed, and/or used by the one or more security applications 37. The one or more security applications 37 allow for creating, storing, managing, or the like of the keys (e.g., pre-shared keys, such as global keys, segmentation keys, communication keys, or the like) and/or the one or more algorithms (e.g., MAC algorithms, or the like), and/or communicate with the systems (e.g., the agents thereon, or the like) on the distributed computing network 2 to facilitate the secure communications.

Moreover, as illustrated in FIG. 1, the one or more third-party systems 40 are operatively coupled to the one or more organization systems 10, the one or more user computer systems 20, the one or more security systems 30, and/or the one or more other systems, through the distributed computing network 2. The one or more third-party systems 40, and/or other like systems have components the same as or similar to the components described with respect to the one or more organization systems 10, the one or more user computer systems 20, and/or the one or more security systems 30 (e.g., one or more communication components, one or more processing components, and one or more memory devices with computer-readable instructions of one or more third-party applications, one or more datastores, or the like). Thus, the one or more third-party systems 40 communicate with the one or more organization systems 10, the one or more user computer systems 20, the one or more security systems 30, and/or each other in same or similar way as previously described with respect to the one or more organization systems 10, the one or more user computer systems 20, and/or the one or more security systems 30. The one or more third-party systems 40 may comprise the systems and applications that are trying to access the network. As such, in some embodiments the third-parties may be unauthorized third-parties that are trying to misappropriate communications between authorized systems on the distributed computing network 2. In some embodiments, the third-parties are authorized entities that are provided access the distributed computing network 2 for various reasons (e.g., to perform maintenance, enter interactions, or the like). In still other embodiments, the third-parties may be external networks through which authorized users 4 (e.g., users that are located outside of the distributed computing network 2, such as located in a foreign/external country/jurisdiction, and are trying to access the distributed computing network 2 from abroad).

The one or more other systems (not illustrated) may include the systems, and components thereof, for allowing communications between the systems (e.g., intermediaries that act as gateways, APIs, or the like to allow communication between the systems).

Figure 2:
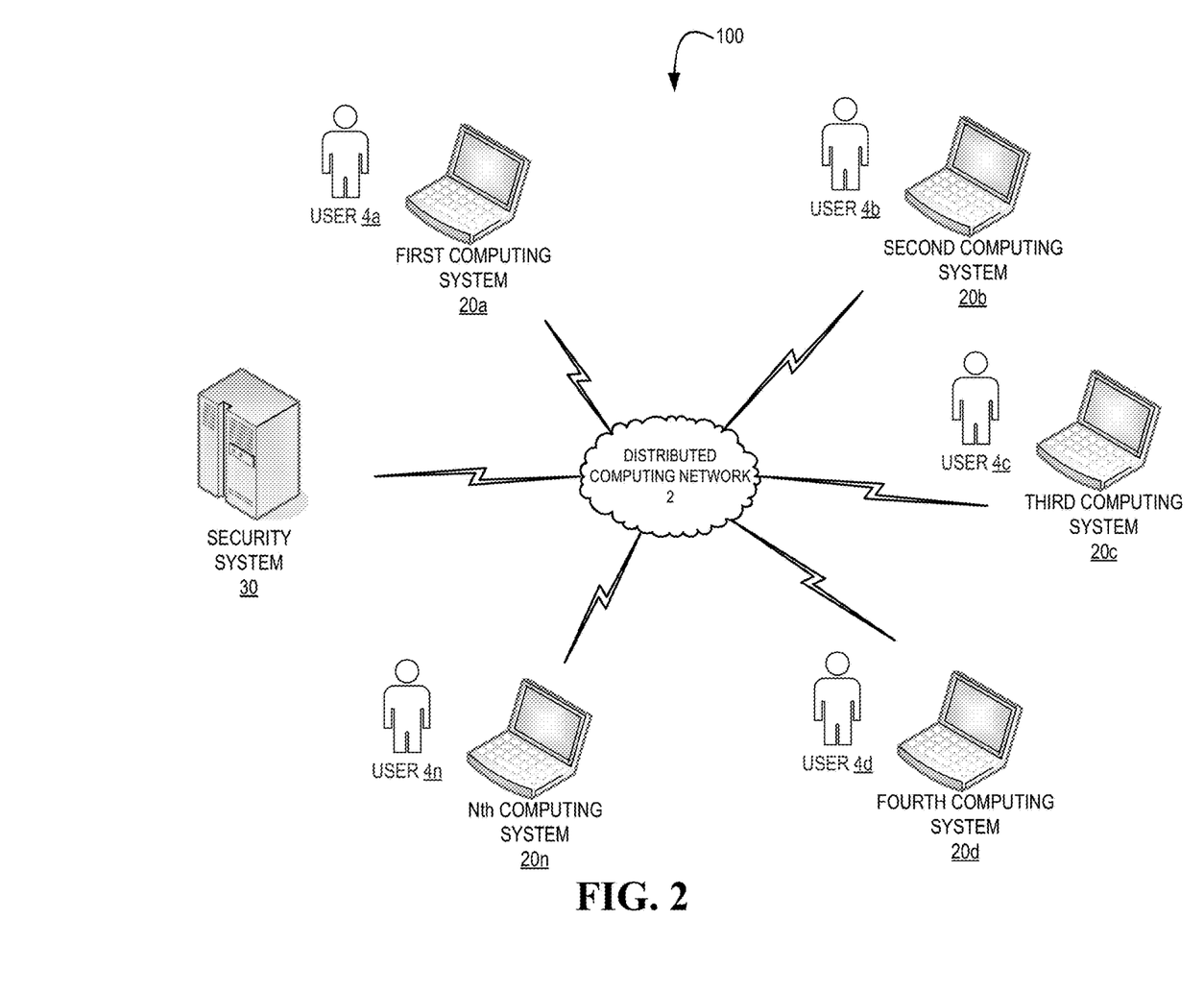
FIG. 2 is a schematic diagram of a network environment in which multiple entity computer systems communicate with each other and the security systems, in accordance with embodiments of the present invention.

FIG. 2 illustrates a network environment 200 in which multiple entity computer systems (e.g., user computer systems 20), and entities (e.g., users 4) associated therewith, communicate with each other and other systems, including, but not limited to the security systems 30, the organization systems 10, or the like. The communications between the systems 20 may be secured as will be described in further detail below. The network environment 200 may be any type of distributed computing network 2, such as an internal network, external network, cross-organizational network, or any type of network of entity computer systems. In some embodiments the network may be a single network; however, in some embodiments while the network is a single network, it may have two or more segmented networks that may be regulated based on signatures (e.g., MAC that are created and identified using keys and/or algorithms) attached to data packets. As such, even though a systems may be able to access the distributed computing network 2, the system may not be able to communicate with other systems on the network (e.g., the system may not have the signature for the network or segments of the network). As illustrated in FIG. 2, the distributed computing network 2 may comprise a first entity computer system 20a, a second entity computer system 20b, a third entity computer system 20c, a fourth entity computer systems 20d, up to an $n^{th}$ entity computer system 20n. As further illustrated in FIG. 2, the computer systems 20a to 20nth may correspond with entities, such as a first user 4a, a second user 4b, a third user 4c, a fourth user 4d, an nth user 4n, or the like. As will be discussed in further detail herein, the systems on the distributed computing network 2 may communicate with each other using real data packets and false data packets.

The present disclosure provides an improved way for sending communications between systems in secure way in order to restrict unauthorized third-party systems from accessing the distributed computing network 2, and if they gain access to the system, to restrict such third-party systems from being able to intercept and comprehend a communication. Furthermore, the present disclosure provides an improved way to allow for external users (e.g., travelers to other countries operating outside of the distributed computing network 2) to access the distributed computing network 2 from an external network and to communicate with the systems on the distributed computing network 2. The present disclosure also allows for providing segmentation of the systems on the network using different signatures (e.g., different keys and/or algorithms) to only allow sub-sets (i.e., segments) of the systems to communicate with each other.

The present invention utilizes and expands upon the conventional referred to "chaffing" technique that is utilized to provide confidential communication between systems on a distributed computing network 2. Communication between systems may involve the sending systems creating and/or sending data packets to the receiving system. The data packets may comprise real/valid data packets and false data packets (otherwise referred to as "chaff" data packets), and the receiving system authenticates the sending system and separates the real data packets from the false data packets. The real data packets include the actual communication (e.g., message, process instructions, file, data, or the like) and/or portions thereof, while the false data packets include imitation/fake data and/or portions thereof.

The data packets (e.g., both real and false data packets) are sent with authentication in form of a signature. The signature may be any type of secure signature that may be used to determine the real versus false data packets, how to assemble the real data packets (if necessary), and/or how to use what key and/or algorithm (if necessary) in order to read the communication. For example, the signature may be a MAC that is created using a key (e.g., a pre-shared key), a MAC algorithm, and in some embodiments the data packet itself (e.g., content of the communication, serial number of the real data packets, both of the forgoing, and/or the like). For example, the key and at least a portion of the data packet are inputs into the MAC algorithm, and the output of the MAC algorithm is the MAC that is attached to the real data packet. The security system 30, and/or individual agents (e.g., pre-loaded applications, or portions thereof) that are located on each system, may be responsible for creating the real data packets with the signature (e.g., authorized signature) and the false data packets with an imitation signature, as will be described herein in further detail.

The receiving system may use the signature in order to determine which data packets are real data packets and which data packets are false data packets that can be discarded. For example, a receiving computer system receiving the data packets (e.g., real/valid data packets, false data packets or the like) may only be able to identify the correct communication using the key (e.g., pre-shared key) and/or a portion of the data packet and the MAC algorithm. That is, the receiving system may recompute the MAC using the pre-shared key, the MAC algorithm and/or a portion of the packet (e.g., pre-agreed upon serial number, content, or the like of the data packet). If the comparison between the determined MAC recreated by the receiving party meets the MAC received by the receiving party the packet is determined to be a real data packet. Alternatively, in the event the determined MAC fails to meet the MAC received by the receiving party, the data packet is determined to a false data packet and is discarded.

It should be understood that any entity on the system can read the contents of any data packet (e.g., the communication/message is not encrypted, hidden, or the like); however, the receiving system can only identify the correct data packets based on validating the signature attached to each data packet (e.g., recreating the MAC signature).

As will be further described herein, in some embodiments of the invention, the false data packets may be generated by the sending computer systems or the security system 30. Alternatively, the false data packets may actually be previously sent data packets that were used for other communications other than the present communication. By using unrelated data packets as the false data packets, the systems are not required to generate false data packets for the communications, which may reduce processing capacity and/or memory requirements, as well as increase processing speeds. The false data packets may appear as though they are real data packets (e.g., correct format, include serial numbers and content, or the like), but the false data packets are characterized by signatures (e.g., MACs, or the like) that are invalid or otherwise incapable of being decoded by a receiving system.

Figure 3:
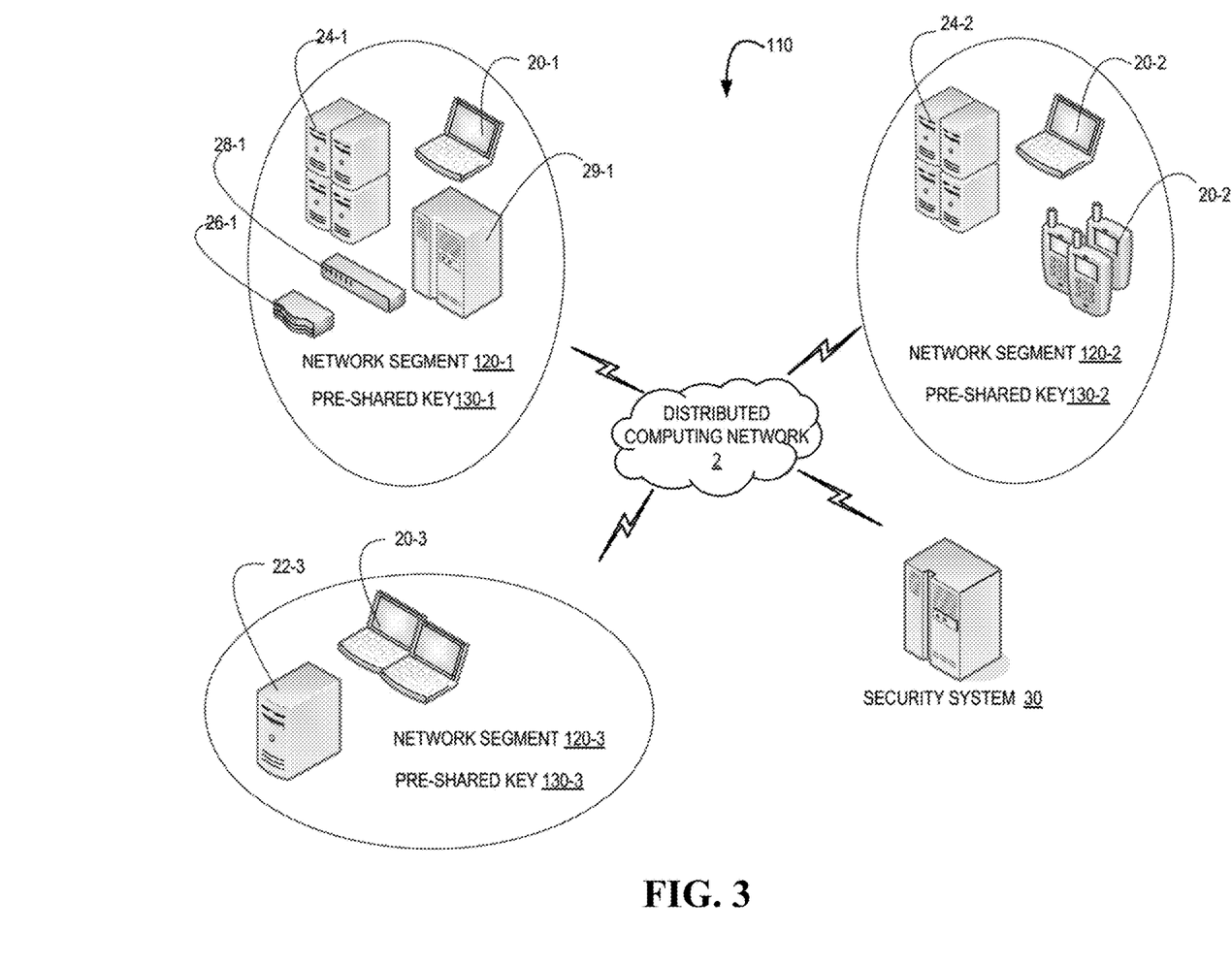
FIG. 3 is a schematic diagram of a system for dynamic segmentation of network traffic, in accordance with embodiments of the present invention.

Referring to FIG. 3, depicted is system 110 for dynamic segmentation of network traffic, in accordance with embodiments of the present invention. The system 110 is implemented within a distributed computing network 2, which may comprise the Internet, one or more intranets or a combination thereof. In some embodiments, the system 110 includes a security system 30 which is configured to manage key exchange protocol for dynamic distribution of pre-shared keys (PSKs) 130 to a plurality of computing hosts 20-29. Distribution of a specific PSK to two or more computing hosts 20-29 defines a network segment 120. In other embodiments of the invention, the computing hosts/noses 20-29 are configured with agents for algorithmically generating shared keys for purposes of creating ad-hoc network segment. An ad hoc network segment, as used herein, may be network segment that is created on demand and/or for a specific purpose and may, in some embodiments, be created for specified period of time or expire after an event, such as completion of the specified purpose. In the illustrated embodiment of FIG. 3, user hosts/nodes 20-1, such as laptop computing host/node; application servers 24-1; router 26-1; switch 28-1 have generated PSK 130-1 or security system 30 has distributed PSK 130-1 to user hosts/nodes 20-1; application servers 24-1; router 26-1; switch 28-1; and mainframe computing host/node 29-1, which collectively form the virtual network segment 120-1. Additionally, user hosts/nodes 20-2, such as laptop computing host/node and mobile communication hosts/nodes; and application server 24-2 have generated PSK 130-2 or security system 30 has distributed PSK 130-2 to user hosts/nodes 20-2; and application server 24-2, which collectively form the virtual network segment 120-2. Further, user hosts/nodes 20-3, such as laptop computing hosts/nodes; and server host/node 22-3 have generated PSK 130-3 or security system 30 has distributed PSK 130-3 to user hosts/nodes 20-3; and server host/node 22-3, which collectively form virtual network segment 120-3.

Once in possession of the PSK 130, computing hosts/nodes 20-29 within a specific network segment 120 are configured to send communications/messages to other computing hosts/nodes within the specific network segment 120 by using the specific PSK 130 to algorithmically generate Message Authentication Code (MAC) and signing all of the data packets that comprise the communication/message with the MAC. In additional embodiments of the system the actual/real data packets may be interspersed with false/chaff data packets that may be generated at the computing host/node or may comprise portions of previous communications/messages.

Once another computing host/node 20-29 within the network segment 120 receives the communication/message, the PSK is used to algorithmically generate the MAC, which is compared to the MAC signature in the data packets. If the generated MAC is determined to match the MAC signature, the data packets are read, while other data packets in the data stream that do not match the generated MAC (i.e., false/chaff data packets) are dropped.

Figure 4:
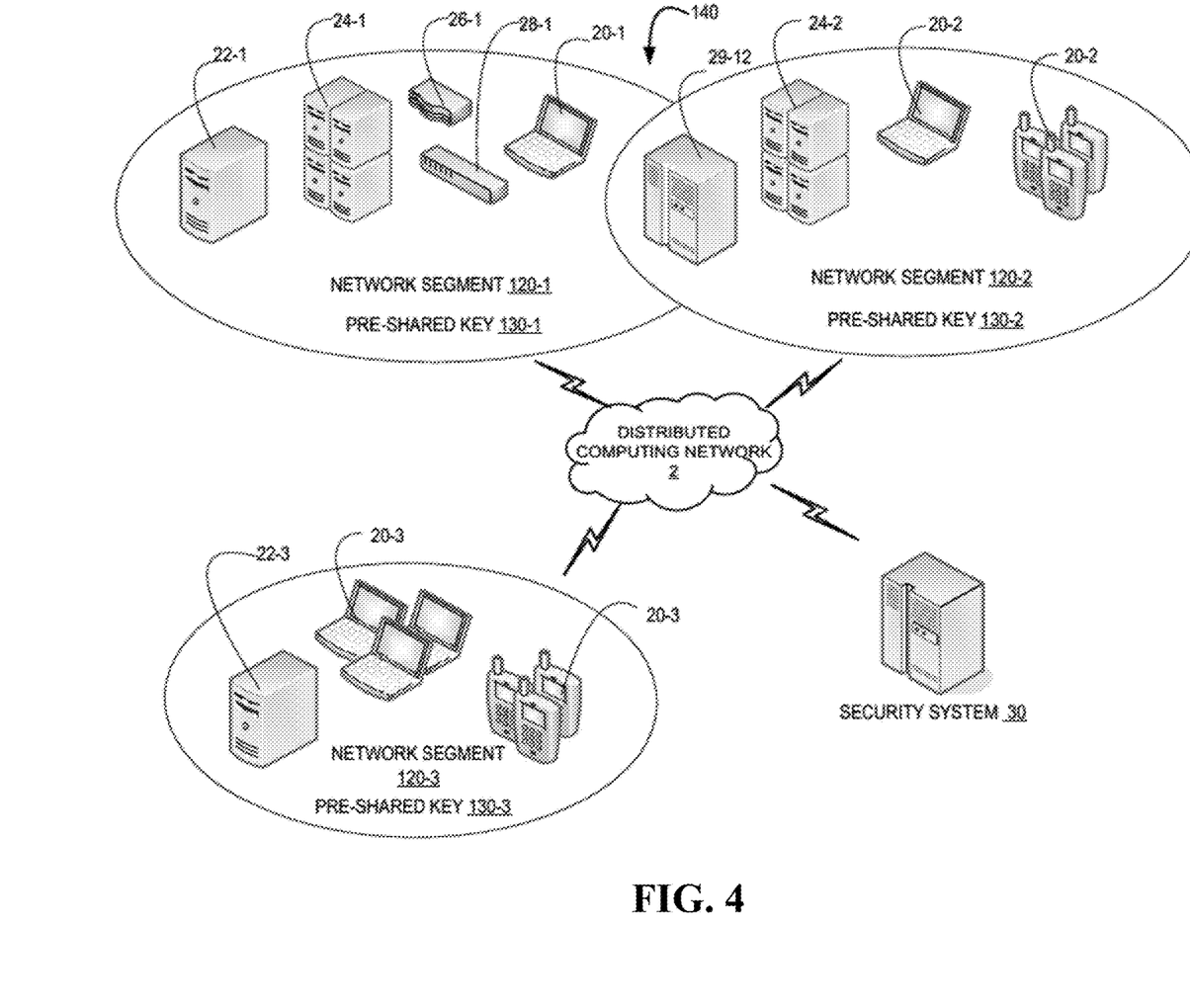
FIG. 4 is a schematic diagram of a system for dynamic segmentation of network traffic highlighting a computing host belonging to multiple network segments, in accordance with embodiments of the present invention.

Referring to FIG. 4, a schematic diagram is depicted of a system 140 for dynamic segmentation of network traffic, in accordance with embodiments of the present invention. Specifically, FIG. 4 highlights embodiments of the invention in which a computing host/nodes resides in multiple network segments 120 simultaneously. In the illustrated embodiment shown in FIG. 4, user host/node 20-2, such as laptop computing host/node; application servers 24-1; router 26-1, switch 28-1 and mainframe computing host/node 29-12 have generated PSK 130-1 or security system 30 has distributed PSK 130-1 to user host/node 20-2; application servers 24-1; router 26-1, switch 28-1 and mainframe computing host/node 29-12, which collectively form the virtual network segment 120-1. Additionally, user hosts/nodes 20-2, such as laptop computing host/node and mobile communication hosts/nodes; application server 24-2 and mainframe computing host/node 29-12 have generated PSK 130-2 or security system 30 has distributed PSK 130-2 to user hosts/nodes 20-2; application server 24-2 and mainframe computing host/node 29-12, which collectively form the virtual network segment 120-2. Further, user hosts/nodes 20-3, such as laptop computing hosts/nodes and server host/node 22-3 have generated PSK 130-3 or security system 30 has distributed PSK 130-3 to user hosts/nodes 20-3 and server host/node 22-3, which collectively form virtual network segment 120-3.

As noted, mainframe computing host/node 29-12 simultaneously resides in two network segments 120-1 and 120-2. Mainframe computing host node 29-12 relies on different PSKs 130-1 and 130-2 and, in some embodiments, different MAC-generating algorithms to generate different MACs, which sign the data packets of different communications/messages depending on which computing hosts/nodes are the intended recipient of a specified communication/message. For example, communications/messages sent from mainframe host/node 29-12 intended for computing hosts/nodes within network segment 120-1 generate a MAC signature using PSK 130-1, while communications/messages sent from mainframe host/node 29-12 intended for computing hosts/nodes within network segment 120-2 generate a MAC signature using PSK 130-2.

Figure 5:
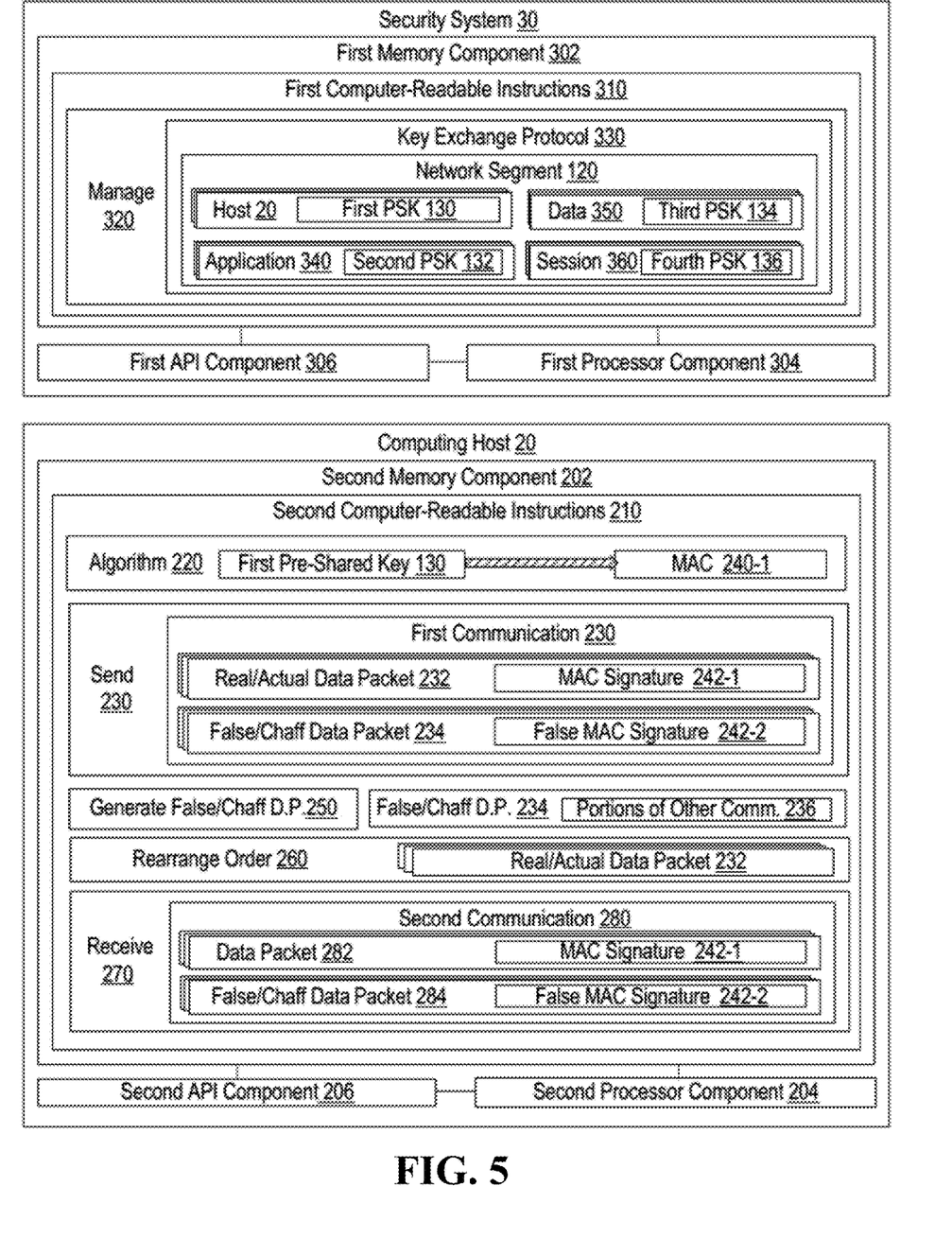
FIG. 5 is a block diagram of a security system and computing host configured for dynamic segmentation of network traffic through the use of pre-shared keys (PSKs), in accordance with embodiments of the present invention.

Referring to FIG. 5, block diagrams are depicted of security system 30 and computing host/node, in accordance with embodiments of the present invention. In addition to providing greater detail, FIG. 5 highlights various alternative embodiments of the invention. The security system 30 may comprise one or more computing devices (e.g., server(s), storage devices or the like) and is configured to execute engines, including instructions, algorithms, modules, routines, applications and the like. Security system 30 includes first memory component 302 and the like which may comprise volatile and non-volatile memory, such as read-only and/or random-access memory (RAM and ROM), EPROM, EEPROM, flash cards, or any memory common to computing platforms). Moreover, first memory component 302 and the like may comprise cloud storage, such as provided by a cloud storage service and/or a cloud connection service.

Further, security system 30 also includes at least one first processor component 304, otherwise referred to as a processing device or the like which may be an application-specific integrated circuit ("ASIC"), or other chipset, logic circuit, or other data processing device configured to execute first instructions 310. First processor component 304 or the like may execute one or more first application programming interface (APIs) components 306 that interface with any resident programs, such as instructions 310 or the like stored in the first memory component 302 of the security system 30 and any external programs. First processor component 304 may include various processing subsystems (not shown in FIG. 5) embodied in hardware, firmware, software, and combinations thereof, that enable the functionality of security system 30 and the operability of security system 30 on a distributed computing network (shown in FIGS. 1-4). For example, processing subsystems allow for initiating and maintaining communications and exchanging data with other networked computing platforms and devices. For the disclosed aspects, processing subsystems of security system 30 may include any processing subsystem used in conjunction with instructions 310 and related engines, tools, routines, sub-routines, algorithms, sub-algorithms, sub-modules thereof.

Security system 30 may additionally include a communications module (not shown in FIG. 5) embodied in hardware, firmware, software, and combinations thereof, that enables electronic communications between security system 30 and other network computing platforms and devices. Thus, communication module may include the requisite hardware, firmware, software and/or combinations thereof for establishing and maintaining a network communication connection with one or more computing platforms and/or network devices.

First memory component 302 of security system 30 stores instructions 310 that are configured to manage 320 key protocol exchange 330 for dynamic distribution of PSKs to a plurality of computing hosts 20. In this regard, instructions 310 are configured to create network segments 120, add or delete computing nodes/hosts or other entities from a network segment and/or delete a network segment on demand.

In specific embodiments of the invention, key exchange protocol 330 is configured to generate and distribute first PSK 130 to a plurality of hosts 20 to create a computing host-based network segment 120. In other embodiments of the invention, key exchange protocol 330 is configured to create other levels on network segments. For example, in specific embodiments of the invention, key exchange protocol 330 is configured to generate and distribute second PSK 132 to a plurality of applications 340 residing on hosts 20. As a result, the network segment 120 provides for communication between specific applications 340 executing on hosts 20. In another example, in other specific embodiments of the invention, key exchange protocol 330 is configured to generate and distribute third PSK 134 to a plurality of data layers 350 within applications 340 residing on hosts 20. As a result, the network segment 120 provides for communication of specific types of data used at the hosts 20 and/or within specific applications 340 executing on hosts 20. In yet another example, in further specific embodiments of the invention, key exchange protocol is configured to generate and distribute fourth PSK 136 that is specific to a particular network session 360. As a result, the network segment 120 provides for communication between designated entities included in the network segment for the duration of the network session 360.

The computing host 20 may comprise one or more computing devices (e.g., server(s), routers, switches, mainframes, and/or user devices, such as PCs, laptops, mobile devices or the like) and is configured to execute agents, including instructions, algorithms, modules, routines, applications and the like. Computing host 20 includes second memory component 202 and the like which may comprise volatile and non-volatile memory, such as read-only and/or random-access memory (RAM and ROM), EPROM, EEPROM, flash cards, or any memory common to computing platforms). Moreover, second memory component 202 and the like may comprise cloud storage, such as provided by a cloud storage service and/or a cloud connection service.

Further, computing host 20 also includes at least one second processor component 204, otherwise referred to as a processing device or the like which may be an application-specific integrated circuit ("ASIC"), or other chipset, logic circuit, or other data processing device configured to execute second instructions 210. Second processor component 204 or the like may execute one or more second application programming interface (APIs) components 206 that interface with any resident programs, such as instructions 210 or the like stored in the second memory component 202 of the computing host 20 and any external programs. Second processor component 204 may include various processing subsystems (not shown in FIG. 5) embodied in hardware, firmware, software, and combinations thereof, that enable the functionality of computing host 20 and the operability of computing host 200 on a distributed computing network (shown in FIGS. 1-4). For example, processing subsystems allow for initiating and maintaining communications and exchanging data with other networked computing platforms and devices. For the disclosed aspects, processing subsystems of computing host 20 may include any processing subsystem used in conjunction with instructions 210 and related agents, engines, tools, routines, sub-routines, algorithms, sub-algorithms, sub-modules thereof.

Computing host 20 may additionally include a communications module (not shown in FIG. 5) embodied in hardware, firmware, software, and combinations thereof, that enables electronic communications between computing host 20 and other network computing platforms and devices.

Thus, communication module may include the requisite hardware, firmware, software and/or combinations thereof for establishing and maintaining a network communication connection with one or more computing platforms and/or network devices.

Second memory component 202 of computing host 20 stores instructions 210 that are configured to, in response to receiving first PSK 130 from the security system 30, transmit/send 230 a first communication 230 to one or more of the other computing hosts residing in network segment 120. First communication 230 comprises a plurality of data packets 232 that are signed with a Message Authentication Code (MAC) signature 242-1. In this regard, instructions 210 employs an algorithm 220 to generate the MAC 240-1 using the first PSK 130.

In alternate embodiments of the invention, as a means of imparting further security features to the communication/message 230, the communication/message 230 may additionally include false/chaff data packets 234, which may include a false MAC signature 242-2. In such embodiments of the invention, instructions 210 may be configured to generate 250 the contents of the false/chaff data packets 234. For example, in specific embodiments of the invention, the false/chaff data packets 234 may be generated from real/actual data packets 232 which are XORed bitwise with a log of network traffic and a pre-computed salt value. Such false/chaff data packet 234 are highly similar to the actual/real data packets 232 but are otherwise meaningless at the receiving entity. In other embodiments of the invention, the contents of false/chaff data packets 234 may comprise portions of other communications/messages previously or concurrently being sent. Use of such false/chaff data packets 234 eliminates the demands placed on the processing components associated with generating false/chaff data packets 234.

In still other embodiments of the invention, instructions 260 include algorithmically rearrange the order 260 in which the real/actual data packets 232 are sent to further obfuscate the contents of the communication/message 230. The first PSK may be used to rearrange the order 260 or some other PSK may be used to rearrange the order 260 in which the data packets 232 are communicated within the data stream.

Further, instructions 210 are configured to, in response to receiving the first PSK 130 from the security system 30, receive a second communication 280 communicated from one of the other computing hosts in the network segment 120. The instructions are further configured to read the second communication/message 280 by using the first PSK 130 to algorithmically generate a MAC and compare the generated MAC to the MAC signature 242-1 in the data packets 282 within a received data stream. If the generated MAC is determined to match MAC signatures 242-1 in the data packets 282, the data packets are read and, in those embodiments in which the data packets require rearrangement, the data packets 282 are arranged in proper order. If the generated MAC is determined to not match MAC signatures (i.e., false MAC addresses 242-2), the data packets are deemed to be false/chaff data packets 284 and are dropped/discarded.

Figure 6:
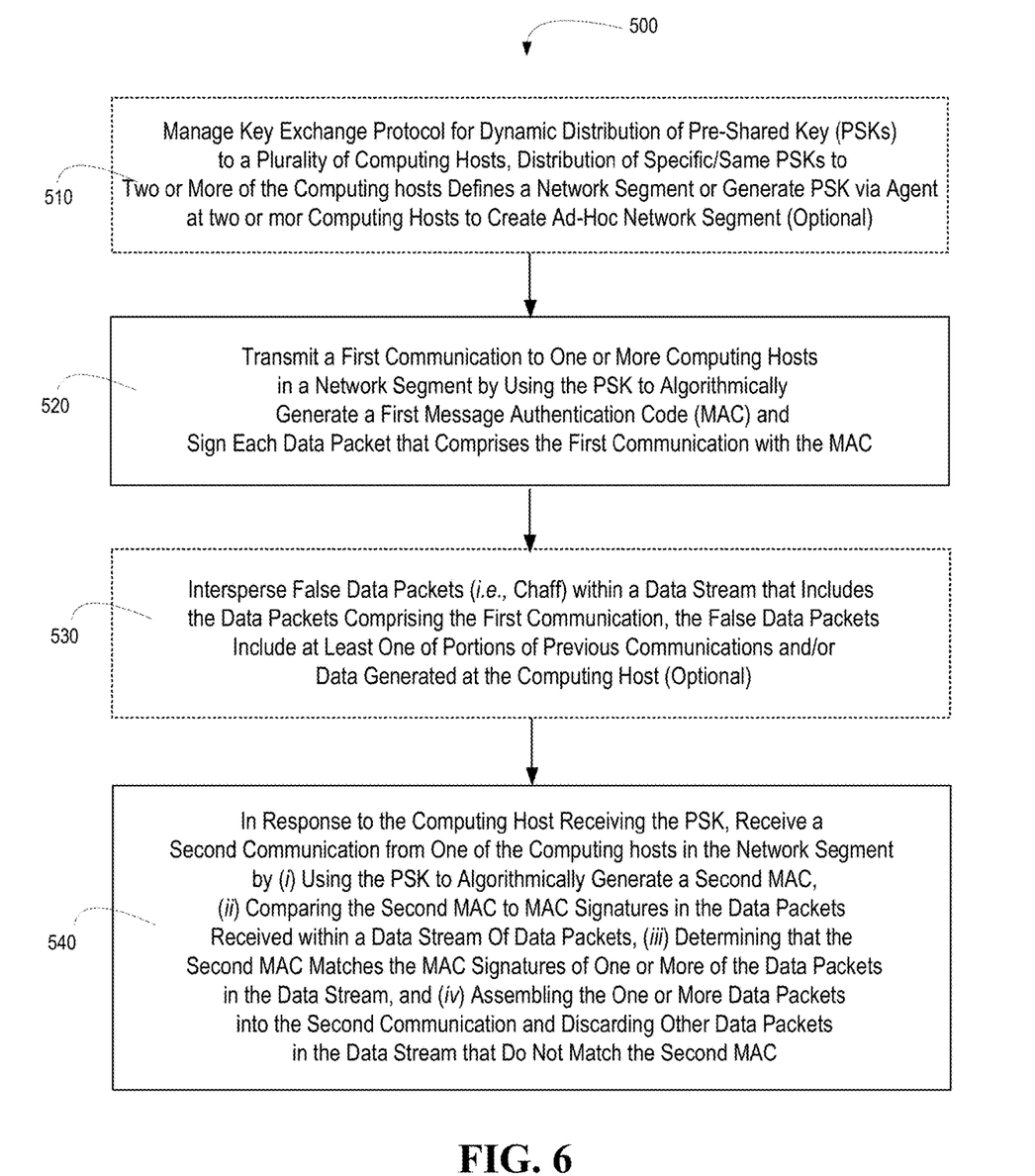
FIG. 6 is a flow diagram of a method for dynamic segmentation of network traffic, in accordance with embodiments of the present invention.

Referring to FIG. 6, a depicted is flow diagram of a method 500 for dynamic segmentation of network traffic, in accordance with embodiments of the present invention. At Optional Event 510, key exchange protocol is centrally managed for distributing PSKs to a plurality of computing entities or other entities (e.g., applications, data layers within applications, network sessions or the like) or computing hosts configured with an agent algorithmically generate shared keys to create ad-hoc network segments. In specific embodiments the agent on the host may employ a Diffie-Hellman key exchange algorithm or the like to generate the shared keys. Distribution or generation of the same PSK to two or more computing hosts or other entities defines a virtual network segment. It should be noted that the hosts and/or key exchange protocol is configured to generate shared keys and manage the distribution of PSKs so that network segments can dynamically, on-demand, be created or deleted and computing hosts or other entities may be added or deleted from a network segment.

At Event 520, a first communication/message is transmitted. The communication/message comprises a plurality of data packets which are signed with a Message Authentication Code (MAC) that is generated algorithmically using the PSK. At optional Event 530, false/chaff data packets are interspersed within the data stream that contains the actual/real data packets. The false/chaff data packets may be generated at the computing host and/or may comprise portions of previous or concurrently transmitted communications/messages. The false/chaff data packets appear as though they are part of the actual communication/message but contain benign data so as to confuse a message intruder or other nefarious entity.

At Event 540, a second communication/message is received and read. The second communication is read by using the PSK to algorithmically generate a MAC and comparing the generated MAC to the MAC signatures in the data packets that comprise the second communication/message. If the generated MAC matches the MAC signature in the data packets these data packets are deemed to part of the communication/message and are read. If the generated MAC does not match the MAC signature in the data packet, these data packets are deemed to be false/chaff data packets and are dropped/discarded. In those embodiments of the invention in which the data packets have transmitted out of order (i.e., rearranged), the PSK or some other key may be used to determine the correct reading order for the data packets.

As evident from the preceding description, the systems, methods and the like described herein represents an improvement in technology, specifically, embodiments of the present invention provide for dynamic segmentation of network traffic through the use of Pre-Shared Keys (PSKs). Each defined network segment uses a different pre-shared key and a message authentication code (MAC)-signing algorithm to sign data packets with segment-specific MACs. As such, only those computer hosts/nodes that are in the network segment (i.e., have been assigned the same pre-shared key for generating and decoding the MAC signed data packets) are capable or reading the segment's network traffic. By implementing segment-specific MAC signed data packets, the present invention allows for confidential data transmission absent the need to encrypt the actual contents/data being transmitted. While in a basic approach segmentation may be configured on a host/node-level, in other embodiments of the invention, the network segmentation be configured on more granular levels, such as, but not limited to, application-layer, data-layer or at the network session layer. In this regard, network segmentation is logical rather than physical and, as such, hosts or other segmented resources may be dynamically moved in to or out of the virtual network segments on demand.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 16/890,564 | NETWORK SECURITY SYSTEM FOR ROGUE DEVICES | Jun. 2, 2020 |
| 16/890,565 | SECURE COMMUNICATION FOR REMOTE DEVICES | Jun. 2, 2020 |

The invention claimed is:

1. A system for dynamic segmentation of computing network traffic, the system comprising:
a plurality of computing hosts, each computing host including a first memory component and at least one first processing component in communication with the first memory component, wherein the first memory component stores first computer-readable instructions that are executable by the at least first one processing component and are configured to:
send a first communication to one or more of the computing hosts comprising a virtual network segment by using a previously received or generated pre-shared key (PSK) to algorithmically generate a Message Authentication Code (MAC) and sign each data packet that comprises the first communication with the MAC, wherein the received or generated PSK defines one of an application-layer network segment, data-layer network segment, or a network-session-based network segment and limits one or more communications being sent and read on the computing host comprising the virtual network segment, and
receive a second communication from one of the computing hosts and read the second communication by using the PSK to algorithmically generate the MAC, comparing the generated MAC to MAC signatures of data packets within a received stream of data packets, determining that the generated MAC matches MAC signatures in one or more data packets within the received stream of data packets, and assembling the one or more data packets into the second communication, wherein other data packets in the stream of data packets having MAC signatures that do not match the generated MAC are discarded.

2. The system of claim 1, further comprising a centralized security system including a second memory component and at least one second processing component in communication with the second memory component, wherein the second memory component stores second computer-readable instructions that are executable by the at least one second processing component and are configured to:
manage key exchange protocol for dynamic distribution of pre-shared keys (PSKs) to the plurality of computing hosts, wherein the distribution of a specific PSK to two or more of the plurality of computing hosts defines a network segment.

3. The system of claim 1, wherein the first instructions are further configured to algorithmically generate the PSK, wherein generation of the PSK by two or more of the computing hosts provides for an ad-hoc network segment.

4. The system of claim 1, wherein the first instructions configured to send the first communication are further configured to:
insert false data packets within a stream of data packets that includes the data packets comprising the first communication.

5. The system of claim 4, wherein the first instructions configured to insert the false data packets are further configured to insert false data packets within the stream of data packets that includes the data packets comprising the first communication, wherein the false data packets include portions of concurrently transmitted other communications or previous communications.

6. The system of claim 4, wherein the first instructions are further configured to generate the false data packets.

7. The system of claim 6, wherein the first instructions configured to generate the false data packets are further configured to generate the false data packets by applying at least one of the data packets to an exclusive or (XOR) gate bitwise with a log of network traffic and a pre-computed salt value.

8. The system of claim 1, wherein the first instructions configured to send the first communication are further configured to algorithmically rearrange the data packets that comprise the first communication in a random order and send the data packets in the random order within a data stream.

9. The system of claim 1, wherein the received or generated PSK defines an application-layer network segment, wherein the application-layer network segment limits communications being sent and read by specific applications executing on the computing hosts comprising the virtual network segment.

10. The system of claim 1, wherein the received or generated PSK defines a data-layer network segment, wherein the data-layer network segment limits communications being sent and read by specific data types within one or more applications executing on the computing hosts comprising the virtual network segment.

11. The system of claim 1, wherein the received or generated PSK defines a network-session-based network segment, wherein the network-session-based network segment limits communications being sent and read to a duration of a specific network session.

12. The system of claim 1, wherein the first instructions are further configured to:
send a second communication to one or more computing hosts in another network segment be using a another previously received or generated pre-shared key (PSK) to algorithmically generate a second Message Authentication Code (MAC) and sign each data packet that comprises the second communication with the second MAC.

13. A computer-implemented method for dynamic segmentation of network traffic, the computer-implemented method is executed by one or more computing device processors and comprises:
transmitting a first communication to one or more computing hosts comprising a virtual network segment by using a previously received or generated pre-shared key (PSK) to algorithmically generate a Message Authentication Code (MAC) and signing each data packet that comprises the first communication with the MAC, wherein the received or generated PSK defines one of an application-layer network segment, data-layer network segment, or a network-session-based network segment and limits one or more communications being sent and read on the computing host comprising the virtual network segment, and receiving a second communication from one of the computing hosts and reading the second communication by using the PSK to algorithmically generate the MAC, comparing the generated MAC to MAC signatures of data packets within a received stream of data packets, determining that the generated MAC matches MAC signatures in one or more data packets within the received stream of data packets, and assembling the one or more data packets into the second communication, wherein other data packets in the stream of data packets having MAC signatures that do not match the generated MAC are discarded.

14. The computer-implemented method of claim 13, further comprising:

managing key exchange protocol for dynamic distribution of pre-shared keys (PSKs) from a centralized computing entity to the plurality of computing hosts, wherein the distribution of a specific PSK to two or more of the plurality of computing hosts defines a network segment.

15. The computer-implemented method of claim 13, further comprising:

algorithmically generating the PSK at two or more of the computing hosts, wherein generation of the PSK by two or more of the computing hosts provides for an ad-hoc network segment.

16. The computer-implemented method of claim 13, further comprising:

inserting false data packets within a stream of data that includes the data packets comprising the first communication, wherein the false data packets include at least one of portions of previous communications and data generated at the computing host.

17. A computer program product including non-transitory computer-readable medium that comprises:

a first set of codes configured to cause a computer processing component to transmit a first communication to one or more of the computing hosts comprising a virtual network segment by using a previously received or generated pre-shared key (PSK) to algorithmically generate a Message Authentication Code (MAC) and signing each data packet that comprises the first communication with the MAC, wherein the received or generated PSK defines one of an application-layer network segment, data-layer network segment, or a network-session-based network segment and limits one or more communications being sent and read on the computing host comprising the virtual network segment, and a second set of codes for causing a computer processing component to receive a second communication from one of the computing hosts and read the second communication by using the PSK to algorithmically generate the MAC, comparing the generated MAC to MAC signatures of data packets within a received stream of data packets, determining that the generated MAC matches MAC signatures in one or more data packets within the received stream of data packets, and assembling the one or more data packets into the second communication, wherein other data packets in the stream of data packets having MAC signatures that do not match the generated MAC are discarded.

18. The computer program product of claim 17, wherein the computer-readable medium further comprises:

a third set of codes for causing a computer processing component to manage key exchange protocol for dynamic distribution of pre-shared keys (PSKs) to the plurality of computing hosts, wherein the distribution of a specific PSK to two or more of the plurality of computing hosts defines a network segment.

19. The computer program product of claim 17, wherein the computer-readable medium further comprises:

a third set of codes for causing a computer processing component to insert false data packets within a stream of data that includes the data packets comprising the first communication, wherein the false data packets include at least one of portions of previous communications and data generated at the computing host.

* * * * *